017# United States Patent [19]

Seltzer

[11] 4,140,658
[45] Feb. 20, 1979

[54] CYANAMIDES OF SECONDARY AMINES AS EPOXY CURING AGENTS

[75] Inventor: Raymond Seltzer, New City, N.Y.

[73] Assignee: Ciba-Geigy Corporation, Ardsley, N.Y.

[21] Appl. No.: 866,673

[22] Filed: Jan. 3, 1978

[51] Int. Cl.$^2$ .................... C08G 59/54; C08G 59/44; C08G 59/50
[52] U.S. Cl. .............................. 528/93; 260/18 EP; 528/109; 528/118; 528/122; 528/123; 528/98; 528/407; 528/418; 528/373
[58] Field of Search ............. 260/47 EN, 2 N, 18 EP, 260/59 EP, 78.41

[56] References Cited

U.S. PATENT DOCUMENTS

| | | | |
|---|---|---|---|
| 3,214,403 | 10/1965 | Peerman | 260/37 |
| 3,478,081 | 11/1969 | Harrison et al. | 260/464 |
| 3,553,166 | 1/1971 | Anderson et al. | 260/47 |

Primary Examiner—Lester L. Lee
Assistant Examiner—E. A. Nielsen
Attorney, Agent, or Firm—Vincent J. Cavalieri

[57] ABSTRACT

Curable compositions are prepared comprising a polyepoxide compound, and as a curing agent, a cyanamide of a secondary amine. The curable compositions may be applied as a one package system and they are useful as laminating, surface coating resins, sintering powders, molding resins and adhesives.

7 Claims, No Drawings

CYANAMIDES OF SECONDARY AMINES AS EPOXY CURING AGENTS

This invention relates to curable epoxy resin compositions which contain cyanamides of secondary amines as epoxy curing agents.

More particularly, this invention provides for curable compositions of matter which consists essentially of (a) a 1,2-polyepoxide compound whith an average of more than one epoxide group in the molecule and (b) as a curing agent, a cyanamide of the formula

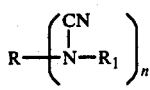

wherein R is an organic radical of valency n which may contain up to 30 carbon atoms; and n represents a number at least equal to 2; $R_1$ is alkyl of 1 to 6 carbon atoms, aryl of 6 to 12 carbon atoms, aralkyl of 7 to 15 carbon atoms, alkaryl of 7 to 15 carbon atoms, cycloalkyl of 5 or 6 carbon atoms, or a 5 or 6 membered heterocyclic group containing carbon and heteroatoms of the group consisting of oxygen, sulfur and nitrogen; or wherein R and $R_1$ together with the nitrogen to which they are attached form a 5 or 6 membered heterocyclic ring containing carbon and heteroatoms of the group consisting of oxygen, sulfur and nitrogen.

A preferred embodiment of this invention provides for a curable composition which consists assentially of (a)a 1,2-polyepoxide compound with an average of more than one epoxide group in the molecule and (b) as a curing agent, a cyanamide of the formula

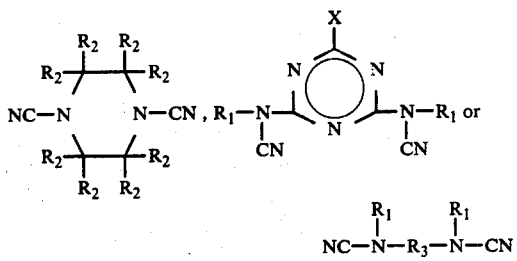

wherein $R_2$ is hydrogen, alkyl of 1 to 6 carbon atoms or aryl of 6 to 12 carbon atoms, X is hydrogen, alkyl of 1 to 6 carbon atoms, aryl of 6 to 12 carbon atoms, diloweralkylamino, diarylamino wherein said aryl group contains 6 to 12 carbon atoms or the group

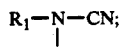

$R_1$ is alkyl of 1 to 6 carbon atoms, aryl of 6 to 12 carbon atoms, aralkyl of 7 to 15 carbon atoms, alkaryl of 7 to 15 carbon atoms, cycloalkyl of 5 or 6 carbom atoms, or a 5 or 6 membered heterocyclic group containing carbon atoms and heteroatoms of the group consisting of oxygen, sulfur and nitrogen; and $R_3$ is alkylene of 2 to 12 carbon atoms, cycloalkylene of 4 to 6 carbon atoms, arylene of 6 to 30 carbon atoms or a 5 or 6 membered heterocyclic group containing carbon atoms and heteroatoms of the group consisting of oxygen, sulfur and nitrogen.

Preferably, R is an aliphatic hydrocarbon radical having 2 to 12 carbon atoms, an aromatic hydrocarbon radical having 6 to 30 carbon atoms or a 5 or 6 membered heterocyclic group containing carbon and heteroatoms of the group consisting of oxygen, sulfur and nitrogen;

Preferably n is 2 to 6 and more preferably 2 or 3.

Preferred embodiments of the term arylene include phenylene, biphenylene, naphthalene, terphenylene and phenanthrylene as well as derivative thereof which contain one or more, preferably up to three non-interferring substituents such as lower alkyl, lower alkoxy, halogen or nitro. Also included within this term is a group of the formula:

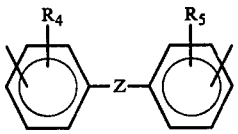

wherein Z is —S—,—O—, NH, N-phenyl, N-(lower) alkyl, sulfonyl, carbonyl, or alkylene containing 1 to 3 carbon atoms; $R_4$ and $R_5$ are independent and each is hydrogen, chloro, bromo, (lower) alkyl or (lower) alkoxy. The term alkyl is the definition of $R_1$ and $R_2$ is intended to include linear and branched as well as saturated and unsaturated groups.

The cyanamide curing agents of the invention are prepared by known methods and include the following two synthetic routes:

1. Reaction of secondary amines with a cyanogen halide:

2. Reaction of cyanamides of primary amines with replaceable halogen compounds.

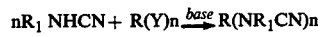

wherein R, $R_1$ and n are as defined previously and Y is chloride, bromide or iodide.

Representative of the secondary amines which may be reacted with the cyanogen halide according to reaction scheme I include the following:

N,N'-dimethylethylenediamine, N,N'-dipropyl-n-phenylenediamine, N,N'-dimethyl-p-phenylenediamine, 4,4'-Bis-(methylamino)-diphenylpropane, 4,4'-Bis-(ethylamino)-diphenyl methane, 4,4'-Bis-(methylamino)-diphenyl sulfide, 4,4'-Bis-(methylamino)-diphenyl sulfone, 3,3'-Bis-(ethylamino)-diphenyl sulfone, 4,4'-Bis-(methylamino)-diphenyl ether, 4,4'-Bis-(Methylamino)benzaphenone, Bis-(4-methylaminophenyl)-N-methylamine, 1,5-Bis-(propylamino)-naphthalene, 3,3'-dimethyl-4,4'-bis-(methylamino)biphenyl, 2,4-Bis(propylamino)-toluene, 4,4'-methylene-bis-(o-chloro-N-methylaniline), 4,4'-methylene-bis-(o-methoxy-N-propyl(aniline), 4,4'-methylene-bis-(N-ethyl-o-methylaniline), N,N'-diethyl-m-xylylenediamine, N,N'-dimethyl-p-xylylenediamine, bis-(N-propyl-4-aminocyclohexyl)-methane, N,N'-diethyl-hexamethylenediamine, N,N'-dimethylheptamethylenediamine, N,N'-dipropyloctamethylenediamine, N,N'-dimethylnonamethylenediamine, N,N'-dipropyldecamethylenediamine, N,N'-diethyl-3-methylheptamethylenediamine, N,N'-dipropyl-4,4-dimethylheptamethylenediamine, 2,11-Bis(methylamino)-dodecane, N,N'-diethyl-2,2-dimethylpropylenediamine, N,N-dipropyl-3-methoxyhexamethylenediamine, 4,4'-(p-methylamino phenyl) disulfide, N,N'-diethyl-2,5-dimethyl hexamethylenediamine, N,N'-dibutyl-2,5-dimethylheptamethylenediamine N,N'-diethyl-5-methylnonamethylenediamine, N,N'-dimethyl-1,4-diaminocyclohexane, N,N'-dibutyl-1,12-diaminooctadecane, 2,5-bis-(ethylamino)-1,3,4-oxdiazole, $(CH_3CH_2)HN(CH_2)_3O(CH_2)_2O(CH_2)_3 NH(CH_2CH_3)$ $(CH_3)HN(CH_2) S(CH_2)_2NH(CH_3)$ $(CH_3CH_2CH_2)HN(CH_2)_3 N(CH_3) (CH_2)_3NH (CH_2CH_2CH_3)$, 2-diphenylamino-4,6-bis(m-methylamino-)-s-triazine, 2-phenyl-4,6-bis-(p-ethylamino-)-s-triazine, 2-phenyl-4,6-bis-(m-butylaminoanilino)-s-triazine, 2-(N-methylanilino-4,6-bis-(m-methylaninoanilino)-s-triazine, 2-dimethylamino-4,6-bis (m-ethylamino-)-s-triazine, 2-diphenylamino-4,6-bis(o-propylamino)-s-triazine, 2-diphenylamino-4,6-bis (p-ethylamino-)-s-triazine, 2-phenyl-4,6-bis-(o-methyl-p-propylamino-)-s-triazine, 2-diphenylamino-4,6-bis (3'-methylaminocyclohexylamino)-s-triazine, 2-piperidino-4,6-bis(m-methylamino-)-s-triazine, 2-phenyl-4,6-bis-(anilino)-s-triazine, 2-diphenylamino-4,6-bis-(anilino)-s-triazine, 2-phenyl-4,6-bis(cyclohexylamino)-s-triazine 1,3-Bis-(3-methylaminopropyl)-5,5-dimethylhydantoin, 1,3-Bis-(3-ethylaminopropyl)-5-ethyl-5-methylhydantoin, 1,3-Bis-(-propylaminoethyl)-5-butyl-5-ethylhydantoin, 1,3-Bis-(beta-methylaminoethyl)-5-sec-amyl-5-ethylhydantoin, 1,3-Bis-(beta-methylaminoethyl)-6-methyluracil, 1,3-Bis-(3'-propylaminopropyl)-6-ethyluracil.

Representative of the compounds with replaceable halogens which may be reacted with the cyanamides of primary amines include the following:

dimethyl sulfate, diethyl sulfate, methyl chloride, methyl bromide, methyl iodide, ethyl chloride, ethyl bromide, ethyl iodide, n-propyl chloride, n-propyl bromide, i-propyl iodide, n-butyl bromide, 1-butyl chloride, sec butyl iodide, n-amyl chloride, 1-amyl bromide, sec ammyliodide, n-hexyl iodide, 1-hexyl chloride, sec hexyl bromide n-heptyl chloride, n-octyl bromide, n-decyl chloride, n-dodecyl bromide, n-octadscyliodide, 1,2-ethylene dichloride, 1,3-propylene dibromide, 1,4-butylene diiodide, 1,5-pentamethylene dichloride, 1,6-hexamethylene diiodide, 1,7-heptamethylene dibromide, 1,8-octamethylene diiodide, 1,5-hexamethylene dichloride, benzyl chloride, o-methyl benzyl bromide, m-ethyl benzyl iodide, p-propylbenzyl chloride, alpha,alpha'-dichloroxylene.

Among the specific examples of organo -(N-substituted) cyanamides which may be used as curing agents in the compositions of this invention are described in U.S. Pat. Nos. 3,817,920 and 3,779,997 and include the following:

ethylene bis-(n-methylcyanamide), propylene bis-(N-ethylcyanamide), hexamethylene bis-(N-butylcyanamide), dodecylene bis-(N-butylcyanamide), propylene bis-(N-cyclohexycyanamide), propyl bis-(N-phenylcyanamide), propylene bis-(N-benzylcyanamide), ethylene bis-(N-methyl-N'-phenyl bis-cyanamide), ethylene bis-(N-(4-chlorophenyl) cyanamide), butylene bis-(N-4-phenoxyphenyl) cyanamide. 1,4-phenylene bis-(N-methylcyanamide), 1,4-phenylene bis-(N-ethylcyanamide), 1,2-phenylene bis-(N-methylcyanamide), 1,4-phenylene bis-(N-phenylcyanamide), 1,4-phenylene bis-(N-phenycyanamide), 1,4-phenylene bis-N-(4-methoxyphenyl)-cyanamide, 1,4-phenylene bis-(N-(4-phenoxyphenyl) cyanamide), 4,4'-diphenyl bis-(N-methyl-cyanamide), 4,4'-diphenyl bis-(N-methylcyanamide), 1,4-naphthalene bis-(N-methylcyanamide), bis-(4-(N-methylcyanamino) phenyl sulfide, bis-(4-(N-phenyl-cyanaminophenyl) ketone, bis-(4-(N-phenylcyanamino) phenyl sulfone, bis-(4-(N-phenylcyanamino) benzyll ketone. 1,3-bis-(4-(N-cyanopiperidyl) propane.

Epoxide resins which may be employed in these compositions are preferably those containing groups of formula

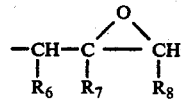

directly attached to atoms of oxygen, nitrogen, or sulphur, where either $R_6$ and $R_8$ each represent a hydrogen atom, in which case $R_7$ denotes a hydrogen atom or a methyl group, or $R_6$ and $R_8$ together represent $-CH_2CH_2-$, in which case $R_7$ denotes a hydrogen atom.

As examples of such resins may be mentioned polyglycidyl and poly (beta- methylglycidyl) esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, dimerised or trimerised linoleic acid, and homopolymers and copolymers of acrylic acid and methacrylic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subeequent treatment with alkali. These ethers may be made from acyclic alcohols such as ethylene glycol, diethylene glycol, and higher poly(oxyethylene)-glycols, propane-1,2-diol and poly(oxyproplene)-glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclhexyl)-propane, and 1,1-bis(hydroxymethyl)cyclohex-3-ene; and from alcohols having aromatic nuclei, such as N,N,-bis(2-hydroxyethyl)aniline and p,p'-bis(2-hydroxyethylamine)diphenylmethane. Or they may be made from mononuclear phenols, such as resorcinol and hydroquinone, and form polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, 2,2-bis(4-hydroxphenyl)propane (otherwise known as bisphenol A), 2,2-bis(3,5-dibromo-4-hydroxy-phenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert, butylphenol.

Poly(N-glycidyl) compounds include, for example those obtained by dehydrochlorination of the reaction products of epichlorohydrin with amines containing at least two aminohydrogen atoms such as aniline, n-butylamine, bis(4-aminophenyl)methane, and bis(4-methyl-aminophenyl)methane; triglycidyl isocyanurate; and N,N'-diglycidyl derivatives of cyclic alkylene ureas, such as ethyleneaurea and 1,3-propyleneurea, and of hydantoins such as 5, 5-dimethylhydantoin.

Examples of poly(S-glycidyl) compounds are di-S-glycidyl derivatives of dithiols such as ethane-1,2-dithiol and bis(4-mercaptomethylphenyl) ether.

Examples of epoxide resins having groups of formula I where R and $R^2$ conjointly denote a —$CH_2CH_2$— group are bis(2,3-epoxycyclopentyl) ether, 2,3-epoxycylopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O- triglycidyl derivative of 4-aminophenol, the glycidyl ether-glycidyl ester of salicylic acid, N- glycidyl-N'-(2-glycidyloxypropyl)-5,5-dimethylhydantoin, and 2-glycidyloxy-1,3-bis(5,5-dimethyl-1-glycidyl-hydantoin-3-yl)propane.

However, epoxide resins in which some or all of the epoxide groups are not terminal may also be employed, such as vinylcyclohexene dioxide, limonene dioxide, dicyclopentadiene dioxide, 4-oxatetracyclo-[$6,2,1,0^{2,7},O^{3,5}$] undec-9-yl glycidyl ether, the bis(4-oxatetracyclo-[$6,2,1,0^{2,7},O^{3,5}$] undec-9-yl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, 3-(3,4,4-epoxycyclohexyl)-8,9-epoxy-2,4-dioxaspiro[5,5] undecane, and epoxidised butadienes or copolymers of butadiene with ethylenic compounds such as styrene and vinyl acetate.

If desired, a mixture of epoxide resins may be used.

Preferred epoxide resins are polyglycidyl ethers, polyglycidyl esters, and N,N'-diglycidylhydantoins. Specific examples of such preferred resins are polyglycidyl ethers of 2,2-bis(4-hydroxyphenyl)-propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of more than 0.5 equivalent per kilogram.

The proportions in which the cyanamides are reacted with the 1,2-epoxide compounds are in the range of from 1 to 4 and preferably 2 to 4 epoxide groups per cyanamide equivalent. One cyanamide equivalent is understood to mean the quantity of cyanamide compound in grams which contains one cyanamide group.

The cyanamide curing agents used in the compositions of this invention are latent curing agents and useful for the preparations of one package systems which possess excellent shelf life at even elevated temperatures.

The cured compositions have good thermal stability and resistance to solvents and chemicals. They show good mechanical and electrical properties as well as high heat distortion temperatures. Curing accelerators can furthermore be employed in the curing reaction; such accelerators are, for example, tertiary amines, their salts or quaternary ammonium compounds, for example 2,4,6-tris(dimethylaminomethyl)-phenol, benzyldimethylamine, 1-methylimidazole, 2-ethyl-4-methylimidazole, 4-aminopyridine, and triamylammonium phenolate; or alkali metal alcoholates, such as, for example, sodium hexanetriolate.

The amount of accelerator will usually range in the amount of from 0.2 to 2 parts by weight per 100 parts of the combined weights of epoxide resin and the curing agent.

The curing of the mixtures, according to the invention of polyepoxide compound (a) and compound (b) is preferable carried out at temperature from 175° to 200° C. over a period of from 1 to 4 hours. The curing can, however, if desired also be carried out at higher temperatures and for longer times. The term "curing," as used here, denotes the conversion of the soluble, either liquid or fusible, polyepoxides into solid, insoluble and infusible, three-dimensionally crosslinked products or materials, accompanied, as a rule, with simultaneous shaping to give mouldings, such as castings, pressings, laminates and the like, or "sheet-like structures," such as coatings, lacquer films or adhesive bonds. The curing can, if desired, also be carried out in 2 stages, by first prematurely stopping the curing reaction, whereby a curable pre-condensate (so-called "B-stage"), which is still fusible and soluble, is obtained from the epoxide component (a) and the curing agent (b). Such a pre-condensate can be stored for a greater or lesser period and can, for example, serve for the manufacture of "prepregs," compression moulding compositions or, especially, sintering powders.

The curable mixtures according to the invention can furthermore contain suitable plasticisers, such as dibutyl phthalate, dioctyl phthalate or tricresyl phosphate, inert organic solvents and so-called active diluents, such as, especially, monoepoxides, for example styrene oxide butylglycid or cresylglycid.

Furthermore, the curable mixtures according to the invention can be mixed, in any stage before curing, with extenders, fillers and reinforcing agents, such as, for example, coal tar, bitumen, textile fibres, glass fibres, asbestos fibres, boron fibres, carbon fibres, mineral silicates, mica, quartz powder, titanium dioxide, hydrated aluminum oxide, bentonites, kaolin, silica aerogel or metal powers, such as aluminium powder or iron powder, and also with pigments and dyestuffs, such as carbon black, oxide pigments, titanium oxide carbon black, oxide pigments, titanium oxide and the like. Furthermore, other customary additives can also be added to the curable mixtures, for example flameproofing agents, such as antimony trioxide, agents for conferring thixotropy, flow control agents, such as silicones, cellulose acetobutyrate, polyvinyl butyral, waxes and stearates (which in part are also used as mould release agents).

The curable mixtures according to the invention can be manufactured in the usual manner, with the aid of known mixing equipment (stirrers, kneaders and rolls).

The curable epoxide resin mixtures according to the invention are above all employed in the fields of surface protection, the electrical industry, laminating processes and the building industry. They can be employed in a formulation suited in each case to the special end use, in the filled or unfilled state, optionally in the form of solutions or emulsions, as paints, lacquers, compression moulding compositions, dipping resins, casting resins, injection moulding formulations, impregnating resins and adhesives, tool resins, laminating resins, sealing and filling compositions, floor covering compositions and binders for mineral aggregates.

The following examples are presented to further illustrate this invention.

EXAMPLE 1

(A) To 10.0g. of the bis-glyidyl ether of bisphenol A (WPE 182-196; vescouty 1200-1600 cps, Araldite 6010) was added 2.1g of N,N'-Dicyanopiperazine (CDP) while raising the temperature to 120-140° C. to affect solution. The epoxy resin-DCP solution was cured at 200° C. for 24 hours. The product was a hard and tough solid. In a control experiment, the epoxy resin was heated alone at 200° C. for 24 hours. The result was a viscous liquid.

(B) Pot Life using N,N-Dicyanopiperazine (DCP)

A mixture of 2.1g of DCP and 10.0g of the bis-glycidyl ether of bis-phenol A used above was heated at 140° C. for 7 hours. No evidence of curing was observed.

EXAMPLE 2

To 10.0g of the bis-glycydyl ether of Bisphenol A used in Example 1 (A) was added 4.30g. of tris-(N-cyanoanilino)-s-trianzine (TNCT) while raising the temperature to 160° C. to affect solution. After curing for 24 hours at 200° C., a hard and brittle material was obtained.

EXAMPLE 3

A mixture of 9 parts of N,N-Dicyanopiperazine (DCP), 100 parts of the bis-glycidylether of Bisphenol A used in Example 1, and 2 parts of benzyl dimethylamine was cured in a glass mold at 150° C. for 3 hours followed by 12 hours of 200° C. On removal from the mold, the casting has the following properties:

Heat Distortion Temperature 108° C.
Flexural Strength 13,000 psi
Flexural Modulus 425,000 psi
Tensile Strength 11,300 psi
Tensile Modulus 429,000 psi

EXAMPLE 4

A mixture of 12.8 parts of N,N' Dicyanopiperazine (DCP), 100 parts of 1,3-diglycidyl-5-ethyl-5-methylhydantoin and 2 parts of benzyl dimethylamine was cured as described in Example 3.

The resulting material had the following properties:

Heat Distortion Temperature 112° C.
Flexural Modulus 465,000 psi

EXAMPLE 5

A mixture of 2.00 parts of triglycidyl isocyanurate (TGIC) and 1.17 parts of N,N'-dicyanopiperazine (DCP) was cured at 200° C. for 14 hours to give a tough, hard material, glass transition temperature (Tg) = 217° C.

EXAMPLE 6

A mixture of 2.00 parts of an epoxy novolac resin having WPE value 176-181 (EPN 1138) and 0.776 parts of N-N'-dicyanopeperazine (DCP) was cured at 200° C. for 14 hours to give a hard material; glass transition temperature (Tg) = 208° C.

What is claimed is:

1. A curable composition of matter which consists essentially of (a) a 1,2-polyepoxide compound with an average of more than one epoxide group in the molecule and (b) as a curing agent; a cyanamide of the formula

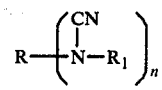

wherein R is an organic radical of valency n which may contain up to 30 carbon atoms; and n represents a number at least equal to 2; $R_1$ is alkyl of 1 to 6 carbon atoms, aryl of 6 to 12 carbon atoms, aralkyl of 7 to 15 carbon atoms, alkaryl of 7 to 15 carbon atoms, cycloalkyl of 5 or 6 carbon atoms, or a 5 or 6 membered heterocyclic group containing carbon and heteroatoms of the group consisting of oxygen, sulfur and nitrogen; or wherein R and $R_1$ together with the nitrogen to which they are attached form a 5- or 6- membered heterocyclic ring containing carbon and heteroatoms of the group consisting of oxygen, sulfur and nitrogen.

2. The curable composition according to claim 1 wherein R is an aliphatic hydrocarbon radical having 2 to 12 carbon atoms, an aromatic hydrocarbon radical having 6 to 30 carbon atoms or a 5- or 6-membered heterocyclic group containing carbon and heteroatoms of the group consisting of oxygen, sulfur and nitrogen; and n is an integer of from 2 to 6.

3. A curable composition according to claim 1 which consists essentially of (a) a 1,2-polyepoxide compound with an average of more than one epoxide group in the molecule and (b) as a curing agent, a cyanamide of the formula

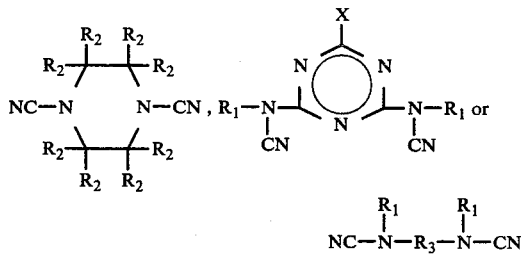

wherein $R_2$ is hydrogen, alkyl of 1 to 6 carbon atoms or aryl of 6 to 12 carbon atoms; X is hydrogen, alkyl of 1 to 6 carbon atoms, aryl of 6 to 12 carbon atoms, diloweralkylamino, diarylamino wherein said aryl group contains 6 to 12 carbon atoms or the group $R_1$—N—CN; $R_1$ is alkyl of 1 to 6 carbon atoms, aryl of 6 to 12 carbon atoms, aralkyl of 7 to 15 carbon atoms, alkaryl of 7 to 15 carbon atoms, cycloalkyl of 5 or 6 carbon atoms, or a 5 or 6 membered heterocyclic group containing carbon atoms and heteroatoms of the group consisting of oxygen, sulfur and nitrogen; and $R_3$ is alkylene of 2 to 12 carbon atoms, cycloalkylene of 4 to 6 carbon atoms, arylene of 6 to 30 carbon atoms or a 5- or 6-membered heterocyclic group containing carbon atoms and heteroatoms of the group consisting of oxygen, sulfur and nitrogen.

4. The curable composition according to claim 1 which contains an effective amount of an accelerator.

5. The curable composition according to claim 4 wherein said accelerator is an organic tertiary amine.

6. The curable composition of claim 1 wherein the curing agent is N,N'-dicyanopiperazine.

7. The curable composition of claim 1 wherein the curing agent is tris-(N-cyanoanilino)-s-triazine.

* * * * *